(12) United States Patent
Tanaka et al.

(10) Patent No.: US 6,422,756 B1
(45) Date of Patent: Jul. 23, 2002

(54) ROLLING BEARING APPARATUS

(75) Inventors: Susumu Tanaka; Manabu Ohori, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 82 days.

(21) Appl. No.: 09/703,591

(22) Filed: Nov. 2, 2000

(30) Foreign Application Priority Data

Nov. 2, 1999 (JP) .......................... 11-313061
Oct. 4, 2000 (JP) .......................... 2000-304356

(51) Int. Cl.⁷ .............................. F16C 33/32
(52) U.S. Cl. ................ 384/492; 384/625; 148/318; 148/333; 148/906
(58) Field of Search .................. 384/492, 625; 148/318, 906, 333

(56) References Cited

U.S. PATENT DOCUMENTS

| | | | | |
|---|---|---|---|---|
| 4,642,219 A | * | 2/1987 | Takata et al. | 148/333 |
| 5,873,956 A | * | 2/1999 | Tanaka et al. | 148/318 |
| 5,998,042 A | * | 12/1999 | Tanaka et al. | 384/490 |
| 6,086,686 A | * | 7/2000 | Tanaka et al. | 148/325 |
| 6,143,425 A | * | 11/2000 | Tanaka et al. | 384/490 |
| 6,171,411 B1 | * | 1/2001 | Okita et al. | 148/318 |
| 6,203,895 B1 | * | 3/2001 | Berger et al. | 384/907.1 |
| 6,224,688 B1 | * | 5/2001 | Takemura et al. | 148/318 |
| 6,228,184 B1 | * | 5/2001 | Tanaka et al. | 148/325 |
| 6,267,511 B1 | * | 7/2001 | Takemura et al. | 384/492 |
| 6,315,455 B1 | * | 11/2001 | Tanaka et al. | 148/318 |
| 6,358,333 B1 | * | 3/2002 | Tanaka et al. | 148/318 |

FOREIGN PATENT DOCUMENTS

| | | | |
|---|---|---|---|
| JP | 5-179401 | 7/1993 | ........... C22C/38/00 |
| JP | 6-341442 | 12/1994 | ........... F16C/33/62 |
| JP | 10-131970 | 5/1998 | ........... F16C/33/58 |

* cited by examiner

*Primary Examiner*—Paul N. Dickson
*Assistant Examiner*—Benjamin A Pezzlo
(74) *Attorney, Agent, or Firm*—Sughrue Mion, PLLC

(57) ABSTRACT

In a balling bearing 1 of small diameter equipped with an outer race 2 and an inner race 3, and a plurality of rolling elements 4 disposed between the outer race 2 and the inner race 3, at least rolling element 4 is composed of a steel of Cr concentration being 8 wt % or higher, and the surface thereof is formed with a layer of N concentration being a range of $3 \leq N\% \leq 0.26 \times Cr\% + 4.42$.

10 Claims, 6 Drawing Sheets

50μm

ROLLING BEARING APPARATUS

BACKGROUND OF THE INVENTION

1. Field of the Invention

The present invention relates to a rolling bearing, in particular, a rolling bearing suited to use to rotation supporting part in information machinery such as a hard disc drive apparatus ("HDD" hereafter), video tape recorder ("VTR" hereafter), or digital audio tape recorder ("DAT" hereafter), another rolling bearing suited to use to vibration acting part in a swing arm as a part of composing elements of such as HDD, or a further rolling bearing suited to use to machinery requiring quietness as in fan motor, cleaner motor, or turbo charger of vehicle.

2. Description of the Related Art

Generally, in the rolling bearings, rolling movement takes place between bearing rings and rolling elements, and since the bearing rings and the rolling elements receive repeated contacting stress, these members are demanded to be hard, durable to load, long in rolling fatigue life, or excellent in abrasion resistance against sliding.

For these materials, there are generally used SUJ2 of Japanese Industrial Standards as bearing steels, SUS440C or 13Cr martensitic stainless steels of Japanese Industrial Standards as stainless steels, and steel materials, as case hardened steels, equivalent to SCR420 of Japanese Industrial Standards, having passed through quenching, carbinization or carbonitriding treatment. Those are subjected to quenching and tempering for providing required hardness, abrasion resistance and rolling fatigue life, and acquire hardness as HRC58 to 64.

Especially, in rolling bearings to be used to information machinery such as HDD, VTR or machinery requiring quietness as fan motor, requirements to reduction of torque, sound or noises are very severe in addition to excellent abrasion resistance or rolling fatigue life.

For materials of the rolling bearings to be employed to such machinery, very often used are SUJ2 as high carbon Cr bearing steels, SUS440C as martensitic stainless steels, or 0.7C-13Cr stainless steel. Those are subjected to quenching and tempering for providing required hardness and abrasion resistance, and acquire hardness as HRC58 to 64. Excepting special situations, basically the rolling element of the present case is composed of material equal to any one of the bearing rings, outer and inner races.

However, various new problems have nowadays arisen, as transportability is heightened by miniaturization of machinery. That is to say, accompanying with the miniaturization of machinery, chances increase of rolling bearings encountering dropping or vibration during transporting, so that rolling bearings incorporated in machinery are injured though being very small, and it has been apparent that those causes to deteriorate machine performance. In short, in case machinery is effected with shock load, particularly in miniaturized rolling bearings, since a contact area between the bearing ring and the rolling element is small, a raceway surface is permanently deformed in spite of relatively small shock load, causing sound deterioration or unevenness in rotating torque, and the performance of machinery incorporated with rolling bearings is worsened.

This problem is considered to appear because yield stress is low in a soft phase of such as residual austenite existing in steel, and such measures are taken that if being SUJ2, it is subjected to a sub-zero treatment after quenching, or tempering at relatively high temperatures as around 220 to 240° C. for lowering the amount of residual austenite and preventing sound deterioration or unevenness in rotating torque by shock load, while keeping the hardness required to rolling bearings.

On the other hand, a main cause of sound deterioration by fine vibration or oscillation of machine is made by injures of rolling elements, and a conventional rolling element composed of steel is, as shown in FIG. 8, formed with considerable fretting abrasion scratches (band pattern of FIG. 8) at contacting part between the inner and outer races. But for fretting created by vibration or movement of machine, a measure by only lubricant has been made, and a measure by improving materials has not been reduced to practice.

With respect to the problem about fretting, a ceramic ball of such as silicon nitride has recently been investigated as to application. Ceramic ball has very high hardness in addition to preferable sliding property, and is least to receive injuries. Therefore, making a rolling element of the ceramic ball, abrasion by adhesion is suppressed, and it has been seen that fretting durability is far increased in comparison with steel ball. Further, a rolling element of ceramic ball is very excellent also in sound durability after continuous driving at high speed.

However, the ceramic ball is very expensive, and is considerably large in elastic coefficient comparing with steel. Therefore the bearing ring is easily formed with indentations by shock load and easy to invite sound deterioration. Besides, since the ceramic ball is very small in coefficient of linear expansion than the steel ball, it has also a problem that preload escaping is generated by rising of temperature when starting a machine, so that rigidity is decreased. As the ceramic is an insulator, static electricity collects foreigners to make rate of badness grow due to noises of dusts. Further, being very small in specific gravity, it has also another problem to easily cause transporting troubles by static electricity during setting up the rolling bearing apparatus.

SUMMARY OF THE INVENTION

Accordingly, the object of the invention is to solve various problems involved about conventional rolling bearings, and to provide such a rolling bearing which is excellent in fretting durability and impact resistance, less to create problems by preload escaping or static electricity (making rate of badness grow due to noises of dusts, easily causing transporting troubles by static electricity during setting up the rolling bearing apparatus), is excellent in sound property, and is low-cost.

To solve the above object, there is provided a rolling apparatus, wherein rolling elements are disposed between an outer member and an inner member, and the rolling elements are rollable with respect to a first contact face being a contact face of the outer member to the rolling elements and a second contact face being a contact face of the inner member to the rolling elements, wherein at least the rolling element is composed of a steel of Cr concentration Cr % being 8 wt % or higher, and an accomplished rolling element is provided on the surface thereof with a layer of N concentration N % being a range of $3 \leq N\% < 0.26 \times Cr\% + 4.42$.

The rolling bearing of the invention is structured of a steel (base material) of the above mentioned composition, and a nitride layer having an appropriate nitrogen concentration and hardness is furnished on at least surface of the rolling element, and is therefore excellent in quietness, sound durability and fretting durability similar to hybrid bearings where the ceramic ball is used as the rolling element. In addition, the rolling bearing of the invention does not have shortcomings of the hybrid bearing, namely, it is good in impact resistance and difficult to cause problems by of preload escaping or static electricity, and it can be suitably used to machinery encountering vibrations as small-sized information machine, or demanded to have high quietness.

As the movable body, such as the outer race is taken up, and as the supporting body, the inner race or an axial body is taken up.

For a steel composing members of rolling bearings (movable body, supporting body and rolling elements), in view of making the surface hardness constantly Hv1100 or higher, and making surface characteristics, in particular, the fretting durability good, a steel containing Cr of at least 8 wt % is desirable. If the Cr concentration Cr % is less than 8 wt %, chromium nitride of an enough amount is not precipitated in the nitride layer, whereby the surface hardness is not often made Hv1100 or higher stably, and the sound durability and the fretting durability trend to be lower in comparison with steels of the chromium concentration of more than 8 wt %.

In contrast, if the chromium concentration is too high, it not only invites cost-up, but also generates a brittle δ ferrite phase, and the chromium concentration is preferably 20 wt % or lower. Besides, if the chromium concentration is high, coarse eutectoid carbide exceeding length of 10 $\mu$m is generated to cause processing troubles, and an aiming precision cannot be accomplished during finishing process. Therefore, desirable is such a steel where the relation between the carbon concentration C % and the chromium concentration Cr % contained in the steel satisfies C %≦−0.05×Cr %+1.41. Other than chromium, if nitride forming elements such as Mo, V, Nb are added in complex, it is possible to more stabilize the surface hardness, and so those may be added in a range as far as cost permits.

Here, a description will be given in detail of the nitride layer of the present invention. FIGS. 7A and 7B are cross-sectional views showing a structure of a nitride treated member, wherein FIG. 7A is the member after the nitride treatment, and FIG. 7B is the member of the accomplished product.

After the nitriding treatment, on the surface of the member, as shown in FIG. 7A, the nitride layer is formed. This nitride layer is composed of a first layer and a second layer just under the first layer, the first layer comprising a false ceramic layer (nitride layer such as $Fe_2N$ (ζ phase), $Fe_{2-3}N$ (ε phase), $Fe_4N$ (γ' phase) and the second layer comprising much quantity of nitrides ($Fe_{2-4}N$, CrN, $Cr_2N$) and tempered martensite.

The false ceramic layer of the first layer is easy to be around 5 to 20 $\mu$m in thickness at the treating temperature is high. This false layer is excellent in slidability and can be suitably used to various kinds of sliding members, but very brittle in comparison with the second layer. In the case of the rolling bearing receiving high shearing force, in particular when high quietness is requested, the existence of this layer is not preferable.

In the second layer containing the tempered martensite, the amount of nitride is much in a region near the first layer, and this amount becomes decreased as coming near to a core portion. Thus, even in the region of the second layer, nitride has a property relatively near the first layer in the vicinity of the first layer.

Therefore, it is preferable that the nitride layer of the invention is as follows.

The nitride layer of the invention is formed by a technique of forming the first layer as least as possible, and is a nitride layer in the surface of an accomplished product by grinding and lapping (see FIG. 7B). That is, by grinding and lapping, the first layer and a region near the first layer in the second layer are removed, and the accomplished surface is the nitride layer of the second layer.

In the nitride layer of the invention, nitrides of one or two kinds or more of ζ phase ($Fe_2N$), ε phase ($Fe_{2-3}N$), γ' phase ($Fe_4N$), CrN, and $Cr_2N$ are precipitated, and the nitride layer includes a tempered martensite. Therefore, the hardness is considerably high, and in addition thereto, the nitride layer of the invention is also excellent in a toughness, so that durability of the material of the rolling bearing such as the rolling element is rapidly heightened and the sound deterioration caused by injuries in the members of the rolling element is remarkably suppressed. But, even if being the nitride layer in the second layer containing the tempered martensite, when the nitrogen concentration is too high, and C %≦0.26 Cr %+4.42 is not satisfied, the tempered martensite of the base decreases, and brittleness much advances not to satisfy the sound durability of the rolling bearing and the durability of such as impact resistance. If the nitrogen concentration is less than 3%, the amount of precipitating nitrides is short and the surface hardness is lowered, and similarly the durability is decreased. From the above, the nitrogen concentration in the nitride layer is preferably in the range of 3%≦N %≦0.26 Cr %+4.42.

The surface hardness is preferably above Hv1100. Being less than Hv1100, the nitride layer in the surface is easily injured, and bad influences may be given to sound characteristic or durability.

Also when the thickness of the nitride layer exceeds 2% of diameter Da of the rolling element, the impact resistance tends to go down. In the vicinity of the boundary between the nitride layer and the base material, the precipitating amount of nitride is inevitably short, so that sufficient hardness and durability are not available. So, it is preferable that the thickness of the nitride layer is 3 $\mu$m or more, and 2% or lower of Da.

With respect to the steel (base material) composing the rotor and the supporter, when the rolling element satisfies the conditions of the invention, if the hardness is above HRC58, SUJ2 described in JIS G 4805 is of course, any steels for bearing are sufficient. But, if contained carbide is large or if an amount of residual austenite is much, satisfactory quietness or durability, for example, impact resistance cannot be obtained. Accordingly, it is preferable that the length of contained carbide is below 5 $\mu$m and an amount of residual austenite is below 6 vol %. If the hardness of the steel composing the movable body and the supporting body is less than HRC58, there will occur problems that the fatigue strength is reduced, the fretting durability and the impact resistance are lowered.

Figure 6:
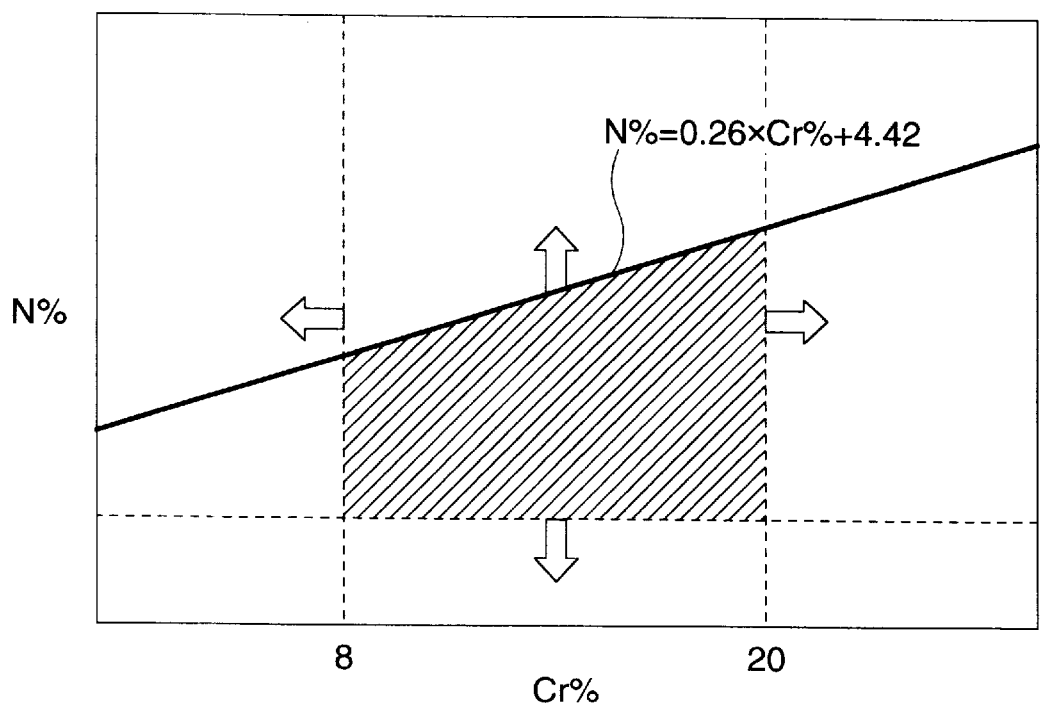
Figure 7A:
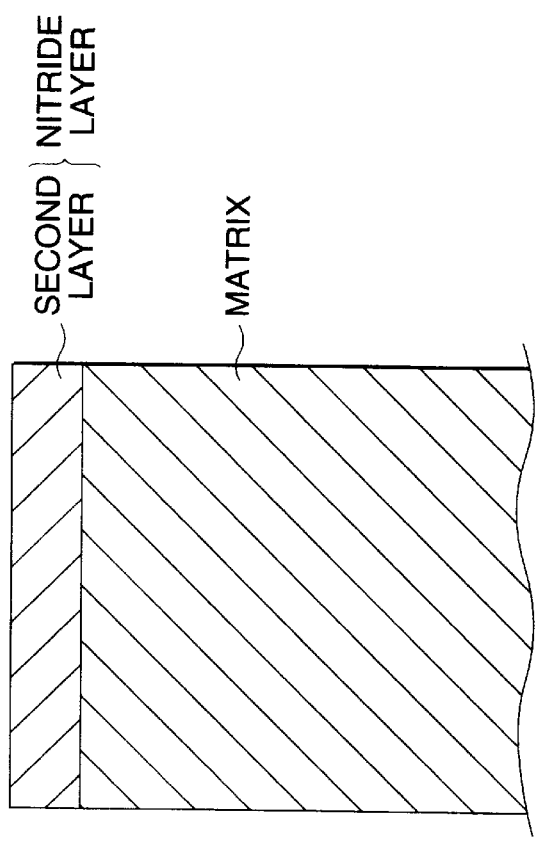
Figure 7B:
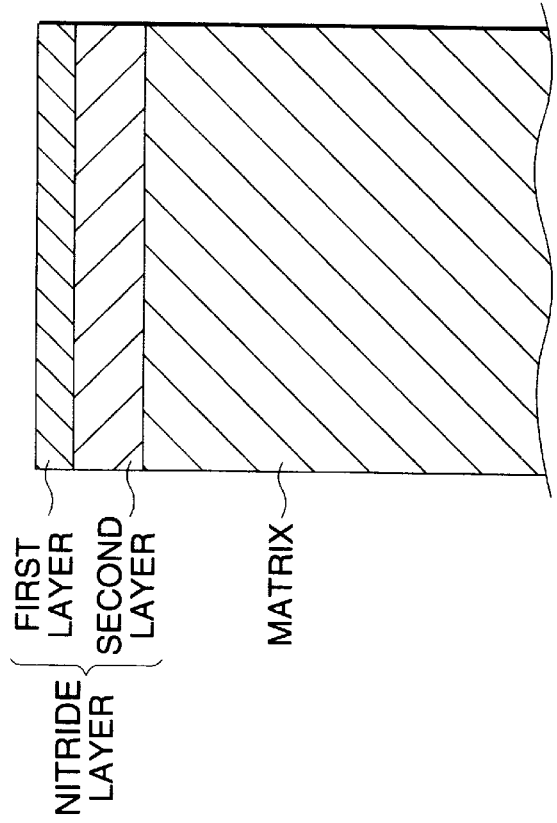
Figure 8:
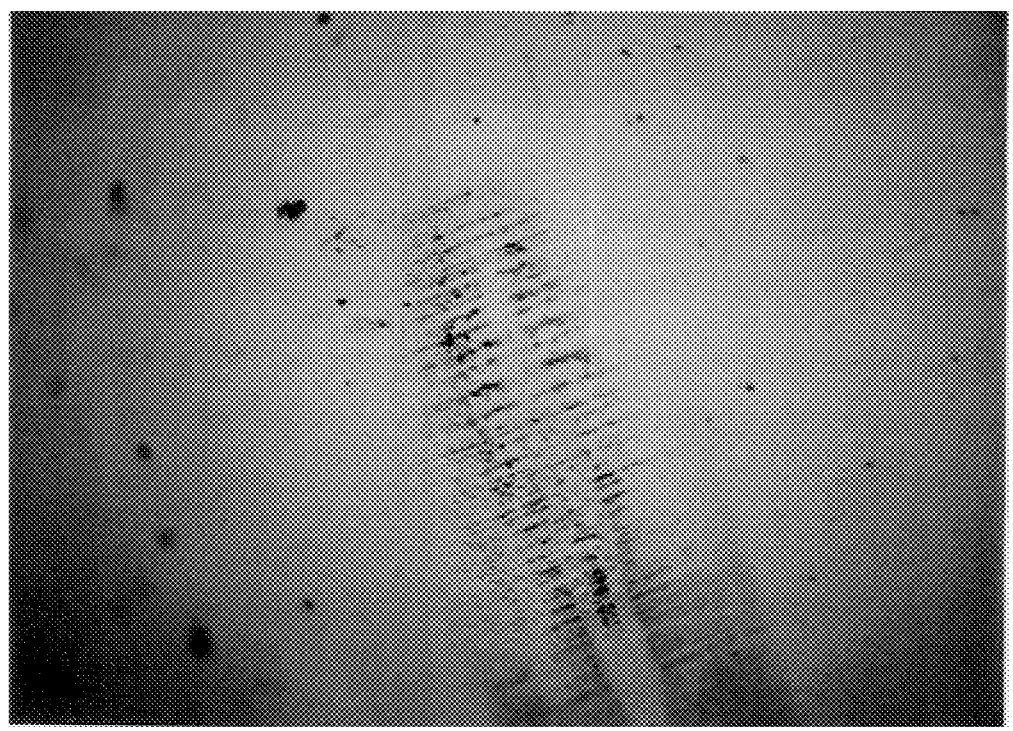

reflection of ε phase by the X-ray diffraction and (110) reflection of α-Fe phase when the steel A-4 is treated with nitriding;

FIG. 6 is a view briefly showing the range of the invention with respect to the Cr content of the steel composing the rolling element and the nitrogen concentration in the nitride layer of the rolling element;

FIGS. 7A and 7B are cross-sectional views showing a structure of a nitride treated member; and FIG. 8 is a view for explaining scratches by fretting abrasion created in the rolling body composed of the conventional rolling bearing.

DETAILED DESCRIPTION OF THE PREFERRED EMBODIMENTS

Figure 1:
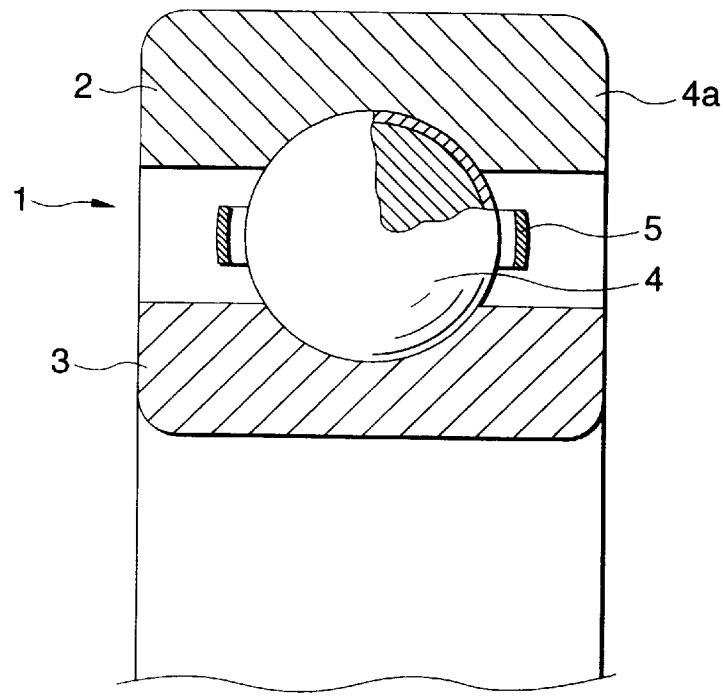
FIG. 1 is a partially cross sectional view showing a structure of one embodiment of the rolling bearing according to the present invention.

Detailed explanation will be made to embodiments of the rolling bearing according to the invention by way of the attached drawings and tables. FIG. 1 is a partially cross sectional view showing a structure of a ball bearing 1 which is one of embodiments of the rolling bearings of the invention, and the rolling element 4 is shown partially in section.

The ball bearing 1 (made by NSK Ltd., JIS bearing number: 695) is composed of a rotatable outer race 2, an inner race 3 supporting the outer race 2, a plurality of rolling elements 4 disposed between the outer race 2 and the inner race 3, and a retainer 5 for retaining the rolling elements 4. The outer race 2 corresponds to the movable body which is one of the composing requirements of the invention and the inner race 3 corresponds to the supporting body of the same.

The outer race 2 and the inner race 3 are composed of SUJ2, and the rolling element 4 is composed of a steel containing 13 wt % Cr, 0.45 wt % C and 0.15 wt % N. The rolling element 4 is carried out with the nitriding treatment on the surface by a later mentioned method, and this surface is formed with a nitride layer 4a of the nitrogen concentration being 5.4 wt %. The surface hardness is Hv1397.

Figure 2:
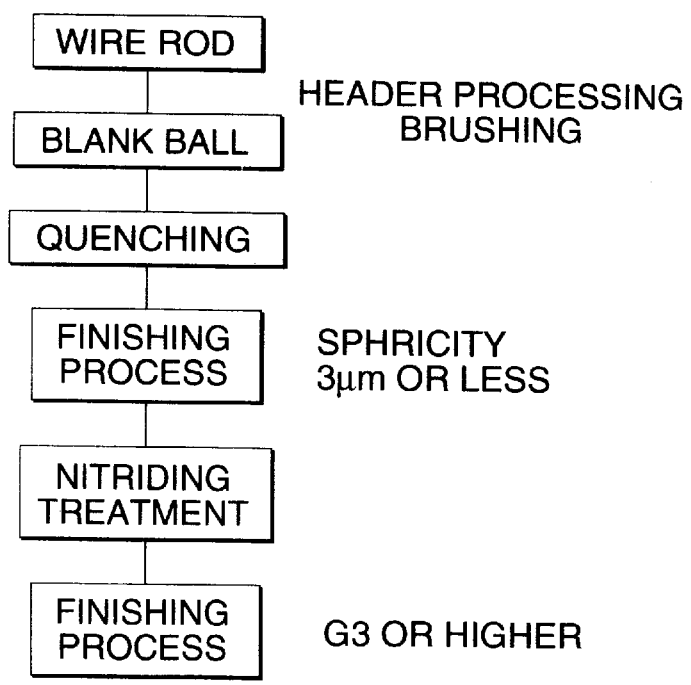
FIG. 2 is a flow chart showing a making process of the rolling bearing.

Next, a description will be given of a making method of the rolling element 4. FIG. 2 is a flow chart showing a making process of the rolling element 4.

At first, a blank ball was made from a wire rod by a cold-drawing, and was hardened by quenching, tempering, and sub-zero treating if required.

Subsequently, the quenched blank ball was performed with a finishing process (lapping) until sphericity of 3.0 µm or lower, preferably 1.0 µm or lower, and brought as a half-processed ball to a following nitriding process. This finishing process advances a grinding to an objective size, namely, until a size adding a setting margin into an accomplished size. The setting margin is a necessary margin for doing the finishing process until an objective precision, of course including an amount of expansion by the subsequent nitriding treatment.

In general, the quenched blank balls have very large difference in sphericities and diameters one another (around 8 to 20 µm), and for performing the finishing process of high precision as grade 3 (G3) or higher, such setting margins of around several tens to hundred µm are necessary. If the quenched blank ball (not yet finish-processing) is brought to the nitriding treatment, the nitride layer is formed to be shaped following a shape of the treated ball, and if it is finish-processed, the nitride layer has a non-uniform thickness, and at the same time, balance of internal stress generated by the nitriding treatment is destroyed and a long time is taken for grinding to a requested precision, otherwise objective precision cannot be very often accomplished. For avoiding scratches from the surface during handling, when making a half-processed ball, it is sufficient that hardness is made somewhat higher by a mechanical hardening process such as barrel or ball peening after the heat treatment.

The obtained half-processed ball was performed with the nitriding treatment to form a nitride layer 4a on the ball surface. As a method of the nitriding treatment, an Nv nitriding process (trade name; DAIDO HOXAN CO., LTD.) was employed, and the conditions were treating temperatures: 380 to 460° C., atmosphere $NH_3$:10 to 75% (the remainder: $N_2$, $H_2$) and treating time: 15 to 24 hours. By selecting the conditions of the above nitriding treatment, the quality of a nitride layer 4a to be obtained can be adjusted.

The steel ball having passed through the nitriding treatment was again performed with the finishing process (lapping) and finished to be an objective precision, specifically, a high precision of grade 3 or higher described in JIS B 1501. In this connection, even if the above-mentioned first layer is formed on the nitride layer 4a by the nitriding treatment, the first layer is removed by this finishing process, and the surface of the ball is covered by the nitride layer 4a composed of the above-mentioned second layer. According to this producing method, uneven grinding of the nitride layer is less, and the stress balance is difficult to be destroyed, so that the thickness of the nitride layer is very uniform, and at the same time, the above mentioned precision can be easily accomplished. In the ball bearings used to the information machinery, a still higher precision has recently been required, and it is preferable that differences in the sphericities and diameters one another is below 0.005 µm and roughness Ra in the surface is below 0.003 µm.

As the method of the nitriding treatment, there are in general a gas nitriding method, a salt bath nitriding method or an ion nitriding method. After the nitriding treatment, since a diffusion hardened layer is formed between an uppermost nitride layer and the base material, an adherence between the film (nitride layer) and the base material is strong and less to be peeled in comparison with an improved film deposited by a vapor evaporation or plating. But, in the case of the rolling bearing, a large shearing stress is received at a position deeper a little than the surface, and if strength is insufficient at a position deeper than the nitride layer, it cannot support the nitride layer so that nitride layer may be often broken. Thus, the hardness in a core portion of the steel ball is preferably HRC 57 or higher. Specifically, as the hardness in the core is determined by the relation between heat resistance of the steel as the base material and the temperature of nitriding treatment, preferably the temperature of the nitriding treatment is below 460° C. If the nitriding temperature is higher than this temperature, a nitride layer having the thick first layer will be formed, so that the nitride layer itself is made brittle, and a finishing process thereafter will be difficult.

The ion nitriding method of the nitriding treatment methods is short in productivity, receives strong influences by shapes of matters to be treated, and is difficult to form uniform nitride layer on the ball surface. Further, in the general gas nitriding method and the salt bath nitriding method, the treating temperature is relatively high as above 500° C., and the heat resistance of the base material is often insufficient. The Nv nitriding process (trade name; DAIDO HOXAN CO., LTD.) applied to this embodiment comprises a fluoridating process as a pre-treatment of the nitriding treatment and a process of the nitriding treatment. The process of fluoridation is carried out at 200 to 350° C. using fluorine based gas such as $NF_3$ (nitrogen trifluoride). The process of the nitriding treatment is performed with, e.g., $NH_3$ gas or a mixed gas of $NH_3$ gas, $N_2$ gas and $H_2$ gas.

In a case of a steel much containing Cr, a close chrome oxide layer is formed on the surface, and this hinders the nitriding reaction and often makes impossible formation of uniform nitride layer. But, this process removes the chrome oxide layer hindering the nitriding reaction by the fluoridizing treatment, and a very thin fluoride layer is formed on the surface layer to activate the surface. Since it is therefore possible to form the uniform nitride layer by the niriding treatment, such a nitriding treatment at very low temperature as 420° C. or lower is also possible.

Figure 3:
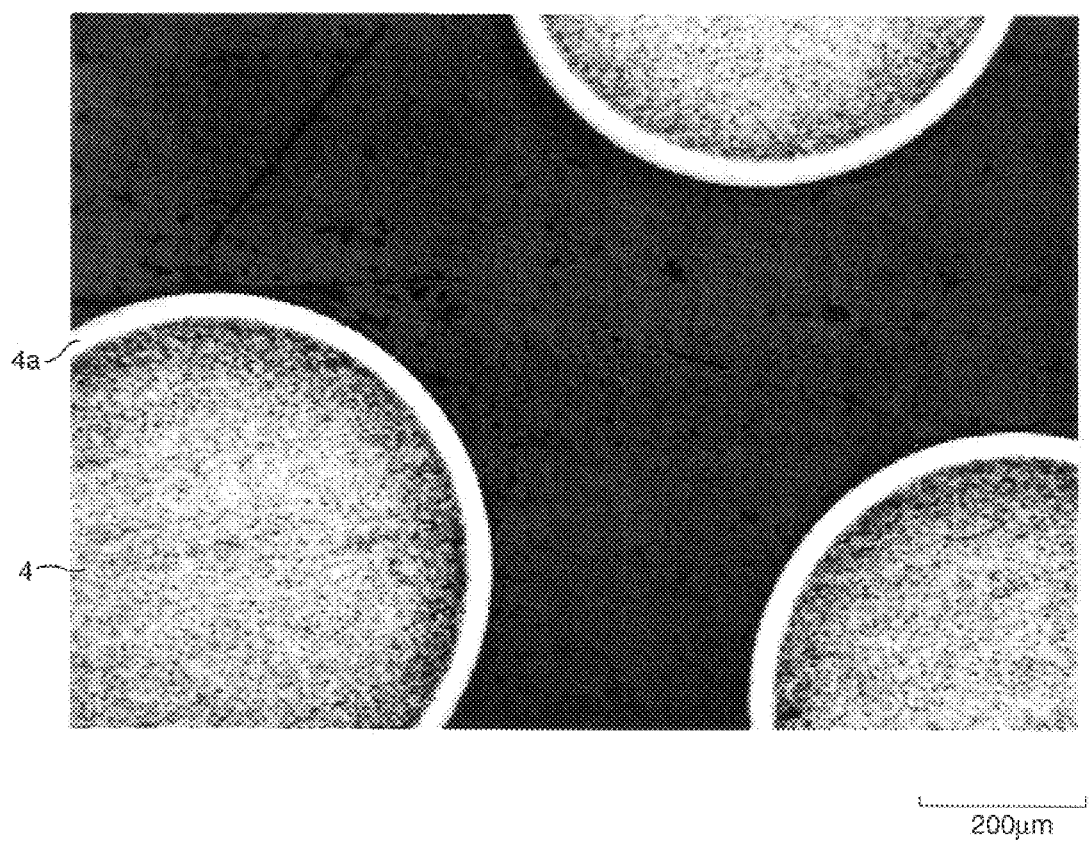
FIG. 3 is a cross sectional view showing the interior structure of the rolling bearing.
Figure 4:
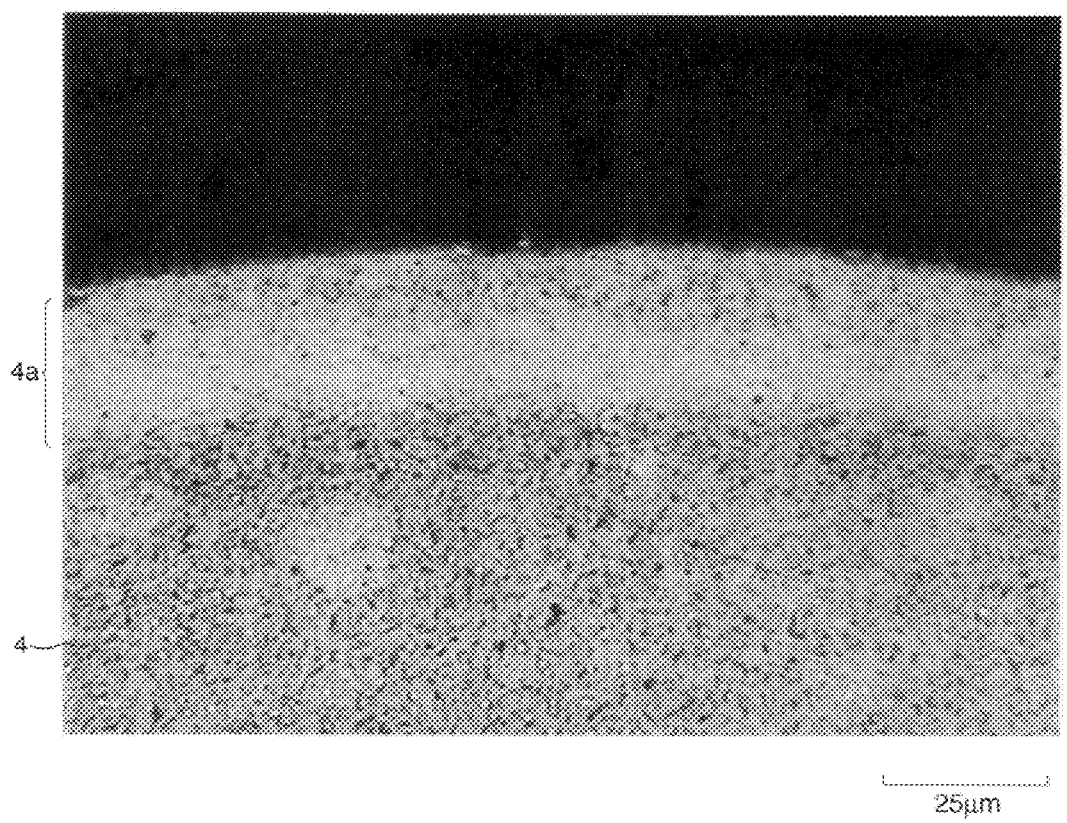
FIG. 4 is an enlarged view of FIG. 3 of enlarging to show the nitride layer in the surface of the rolling bearing.

Cross sectional views of the rolling elements 4 obtained in such manners are shown in FIGS. 3 and 4. FIG. 3 is a view where the obtained rolling element 4 was cut into two, the cross sections thereof were mirror-ground, etched with a marble reagent, and observed by an optical microscope. FIG. 4 is an enlarged view of FIG. 3, showing the nitride layer 4a in the surface of the rolling element 4. From these figures, it is seen that the nitride layer 4a of the uniform thickness (about 25 μm) is formed on the surface of the rolling element 4.

Next, detailed explanation will be made to results that the respective kinds of rolling elements were manufactured by the same method as the above-mentioned one from the respective kinds of steels (A-1 to A-6) shown in Table 1, and the quietness of ball bearings of small diameter (bearing number: 695) and performance of durability were measured.

The Cr amounts of the manufactured rolling elements, the nitrogen concentration in the nitride layer, and the surface hardness are shown in Tables 2 and 3.

TABLE 1

|  | Carbon concentration (wt %) | Cr concentration (wt %) | Upper limit of carbon concentration[1] (wt %) | Remarks |
|---|---|---|---|---|
| A-1 | 1.0 | 1.5 | 1.34 | SUJ2 |
| A-2 | 0.8 | 4.0 | 1.21 | M50 |
| A-3 | 0.8 | 8.0 | 1.01 |  |
| A-4 | 0.65 | 13.0 | 0.76 |  |
| A-5 | 0.45 | 13.0 | 0.76 | Nitrogen concentration 0.15 wt % |
| A-6 | 0.40 | 18.0 | 0.76 | Nitrogen concentration 0.15 wt % |

[1]Upper limit of carbon concentration obtained by the following formula C % = −0.05 × Cr % + 1.41

TABLE 2

|  | Materials | Cr contents (wt %) | Nitrogen concentration (wt %) | Hardness Hv (Load 100 g) | Upper limit of nitrogen concentration[2] (wt %) |
|---|---|---|---|---|---|
| Ex.B-1 | A-3 | 8.0 | 6.5 | 1243 | 6.5 |
| Ex.B-2 | A-3 | 8.0 | 5.1 | 1251 | 6.5 |
| Ex.B-3 | A-3 | 8.0 | 3.9 | 1135 | 6.5 |
| Ex.B-4 | A-4 | 13.0 | 7.7 | 1321 | 7.8 |
| Ex.B-5 | A-4 | 13.0 | 5.6 | 1367 | 7.8 |
| Ex.B-6 | A-4 | 13.0 | 3.8 | 1325 | 7.8 |
| Ex.B-7 | A-5 | 13.0 | 5.4 | 1397 | 7.8 |
| Ex.B-8 | A-5 | 13.0 | 3.0 | 1228 | 7.8 |

TABLE 2-continued

|  | Materials | Cr contents (wt %) | Nitrogen concentration (wt %) | Hardness Hv (Load 100 g) | Upper limit of nitrogen concentration[2] (wt %) |
|---|---|---|---|---|---|
| Ex.B-10 | A-6 | 18.0 | 9.1 | 1267 | 9.1 |
| Ex.B-11 | A-6 | 18.0 | 6.1 | 1356 | 9.1 |

[2]Upper limit of nitrogen concentration obtained by the following formula N% = 0.26 × Cr % + 4.42
Ex.: Example

TABLE 3

|  | Materials | Cr contents (wt %) | Nitrogen concentration (wt %) | Hardness Hv (Load 100 g) | Upper limit of nitrogen concentration[2] (wt %) |
|---|---|---|---|---|---|
| Com.C-1 | A-1 | 1.5 | — | 854 | — |
| Com.C-2 | A-1 | 1.5 | 2.1 | 763 | 4.81 |
| Com.C-3 | A-2 | 4.0 | 7.8 | 1135 | 5.46 |
| Com.C-4 | A-2 | 4.0 | 4.5 | 1098 | 5.46 |
| Com.C-5 | A-3 | 8.0 | 9.3 | 1173 | 6.5 |
| Com.C-6 | A-3 | 8.0 | 2.7 | 1041 | 6.5 |
| Com.C-7 | A-4 | 13.0 | 8.6 | 1278 | 7.8 |
| Com.C-8 | A-4 | 13.0 | 2.3 | 1067 | 7.8 |
| Com.C-9 | A-5 | 13.0 | — | 806 | 7.8 |
| Com.C-10 | A-5 | 13.0 | 11.2 | 1254 | 7.8 |
| Com.C-11 | A-6 | 18.0 | 11.6 | 1264 | 9.1 |
| Com.C-12 | 3) | — | — | 1621 | — |

[2]Upper limit of nitrogen concentration obtained by the following formula N % = 0.26 × Cr % + 4.42
3) $Si_3N_4$
Com.: Comparative Example In case thickness of the nitride layer exceeded 2% of the diameter Da of the rolling element, since the impact resistance trended to decrease when incorporating the rolling elements into the ball bearing, the nitride layer was formed to be 10 to 30 μm such that all the nitride treated rolling elements were below 2% of Da (in a case of the ball bearing of small diameter of bearing number 695, 2 mm), and thickness of the nitride layer was measured by observation of the optical microscope.

With respect to the hardness of the surface, the surface of the rolling element was measured at the load of 100 g with a micro Vickers hardness meter. The nitrogen concentration in the nitride layer (surface) of the rolling element was measured with EPMA (accelerating voltage of 15 kV) by measuring characteristic X-ray strength of nitrogen.

The ball bearing of small diameter (bearing number 695) was made by incorporating the above mentioned ball bearing,and evaluations were made on initial sound, sound durability, fretting durability and impact resistance. The results are shown in Tables 4 and 5. For comparison, evaluations were also made to cases that the rolling elements were a conventional SUJ2 and silicon nitride ceramic.

TABLE 4

|  | Materials | Initial Sound | Sound resistance | Fretting resistance | Impact resistance (N) |
|---|---|---|---|---|---|
| Ex.B-1 | A-3 | 1.07 | 0.24 | 0.31 | 58.8 |

TABLE 4-continued

| Materials | | Initial Sound | Sound resistance | Fretting resistance | Impact resistance (N) |
|---|---|---|---|---|---|
| Ex.B-2 | A-3 | 1.05 | 0.21 | 0.28 | 58.8 |
| Ex.B-3 | A-3 | 1.06 | 0.22 | 0.28 | 63.7 |
| Ex.B-4 | A-4 | 1.05 | 0.19 | 0.24 | 58.8 |
| Ex.B-5 | A-4 | 1.02 | 0.15 | 0.19 | 63.7 |
| Ex.B-6 | A-4 | 1.02 | 0.17 | 0.22 | 68.6 |
| Ex.B-7 | A-5 | 0.99 | 0.15 | 0.18 | 63.7 |
| Ex.B-8 | A-5 | 1.00 | 0.18 | 0.24 | 63.7 |
| Ex.B-10 | A-6 | 1.08 | 0.22 | 0.25 | 58.8 |
| Ex.B-11 | A-6 | 1.01 | 0.16 | 0.20 | 63.7 |

Ex.: Example

TABLE 5

| | Materials | Initial sound | Sound resistance | Fretting resistance | Impact resistance (N) |
|---|---|---|---|---|---|
| Com.C-1 | A-1 | 1.00 | 1.00 | 1.00 | 63.7 |
| Com.C-2 | A-1 | 1.13 | 1.11 | 1.38 | 53.9 |
| Com.C-3 | A-2 | 1.78 | 0.66 | 0.49 | 19.6 |
| Com.C-4 | A-2 | 1.65 | 0.72 | 0.62 | 53.9 |
| Com.C-5 | A-3 | 1.09 | 0.63 | 0.49 | 29.4 |
| Com.C-6 | A-3 | 1.02 | 0.58 | 0.44 | 58.8 |
| Com.C-7 | A-4 | 1.08 | 0.43 | 0.39 | 34.3 |
| Com.C-8 | A-4 | 1.01 | 0.39 | 0.41 | 63.7 |
| Com.C-9 | A-5 | 1.03 | 0.68 | 0.62 | 53.9 |
| Com.C-10 | A-5 | 1.10 | 0.45 | 0.37 | 4.9 |
| Com.C-11 | A-6 | 1.12 | 0.46 | 0.39 | 14.7 |
| Com.C-12 | 3) | 1.11 | 0.19 | 0.24 | 0.0 |

3) $Si_3N_4$
Com.: Comparative Example

The used rolling elements are all very well conditioned as sphericity of below 0.05 μm, ball weavness of below 40 npc in M.B (threads: 5 to 30 per circumference) and below 83 npc in H.B (threads: 30 to 160 per circumference). As the outer race and the inner race, SUJ2 was employed, and from viewpoint of the impact resistance after quenching, this material was carried out with the sub-zero treatment at −90° C. for 30 minutes, and further with tempering at 160 to 240° C. for 2 hours, resulting in the residual austenite of below 6%. The retainer was a plastic-made retainer, and the lubricant of the bearing was an ester based rust proofing oil of kinematic viscosity being 10 cSt and a mineral based grease.

The evaluated contents and the testing conditions of the respective performance of the above ball bearings of small diameter are as follows.

(1) Initial Sound

The initial sound was measured on the axial vibration acceleration (G value) when the ball bearing was actuated at preload of 11.8 N and rotation number of 1800 rpm, and in Tables 3 and 4, the average value was obtained from the measured values of 10 samples, and the initial sound was shown with relative values, assuming that the value of the ball bearing that the rolling element made of SUJ2 of the comparative example C-1 was used was 1.

(2) Sound Durability

The sound durability was again measured on the axial vibration acceleration (G value) when the ball bearing was actuated at preload of 11.8 N, rotation number of 7200 rpm, at temperature of 70° C. and for 2000 hours, and similarly the average value was obtained from the measured values of 10 samples, and the sound durability was shown with relative values when the comparative example C-1 was 1.

(3) Fretting Durability

The oscillation was made under the following conditions, and the acceleration of the axial vibration was measured, and similarly the average value was obtained from the measured values of 10 samples, and the fretting durability was shown with relative values when the comparative example C-1 was 1.

Preload: 11.8 N
Oscillating condition: 4°, 27 Hz
Oscillating number: 500,000 times (4) Impact Resistance The pure axial load was burdened 11.8 N at first, subsequently 49.0 N and thereafter as increasing by 4.9 N, and the point where the acceleration of the axial vibration increased by 5 mG in comparison with before the test, was determined to be the shock resisting load, and the impact resistance was evaluated with the difference from the impact resistant load of the ball bearing incorporated with the ceramic ball of the comparative example C-12 as the rolling element.

From Tables 4 and 5, it is confirmed that the quietness and the durability of the respective examples are very good in comparison with the comparative examples. On the other hand, with respect to the comparative example C-1 which is the bearing employing the rolling element composed of the conventional SUJ2, although the initial sound is very good, in all durability excepting the impact resistance, the comparative example C-1 is inferior to each of the examples and the hybrid bearing (comparative example C-12) using the ceramic ball. The comparative example C-2, the bearing which uses the rolling element with the nitride treatment of the conventional SUJ2, is less in the Cr content, so that a sufficient hardness is not provided by the nitriding treatment, and instead the durability is decreased. The comparative examples C-3 and C-4, where Cr content is not up to 8%, are excellent in the durability comparing with the comparative example C-1 using the rolling elements of the conventional SUJ2, but the durability is inferior to those of the respective examples, irrespective of the nitrogen concentration. The comparative examples C-5 to C-8, C-10 and C-11 are cases where the nitrogen concentration in the nitride layer is higher or lower than the range of the invention. The durability is superior to that of the comparative example C-1, but inferior to those of the respective examples.

Figure 5:
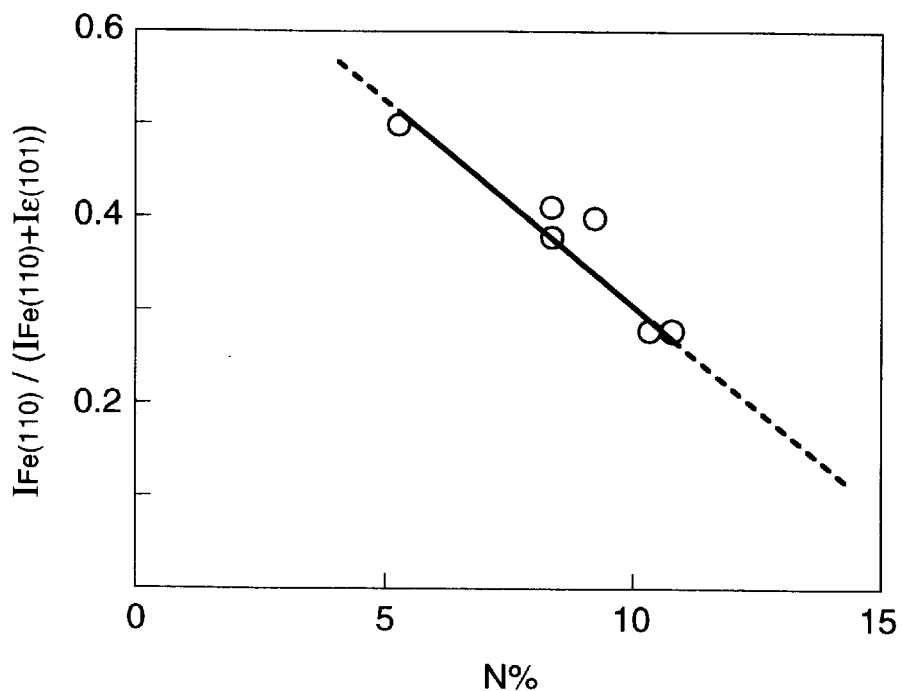
FIG. 5 is a graph showing the relation between the nitrogen concentration N % and strength ratio of (101)

Being the high nitrogen concentration means that the amount of nitride in the nitride layer is much. That is, α-Fe (tempered martensite) in the base decreases. FIG. 5 is a graph showing the relation between the nitrogen concentration N % and strength ratio of (101) reflection of ε phase by the X-ray diffraction and (110) reflection of α-Fe phase when the steel A-4 is treated with nitriding, the strength ratio being $(I_{Fe(110)}/(I_{Fe(110)}+I_{\epsilon(101)}))$. As seen from FIG. 5, when the nitrogen concentration increases, α-Fe (tempered martensite) in the base decreases. It is assumed that if α-Fe (tempered martensite) in the base decreases, adhesion is inherently difficult to occur between the two phases, and the fretting durability and the sound durability is improved, however, if the nitrogen concentration does not satisfy N %≦0.26×Cr %+4.42, the desirable durability cannot be provided. Then, the interior of the bearing was observed.

The surfaces of the rolling elements were observed after the fretting test, the fretting abrasion scratches as apparent in FIG. 8 were not observed, and then, the rolling ring was observed. As a result, when the nitrogen concentration did not satisfy N %≦0.26×Cr %+4.42 or it was less than 3%, the abrasion scratches by fretting were observed.

That is, it is considered that α-Fe (tempered martensite) in the base in the nitride layer formed in the surface of the rolling element is largely relative with the durability of the bearing. The comparative example C-9 is a case where the rolling element is composed of the steel A-5, and the durability is inferior in comparison with the respective examples, but superior to that of the comparative example C-1, and as a result of observing the interior concerning injuries after the fretting test, the rolling ring was very little damaged. This is assumed that if the Cr concentration is high, a film of chromium oxide is formed on the surface of the rolling element, and this film suppresses injuries of a contacting opponent (bearing ring). From the above mentioned results, the cause for obtaining the good durability in the examples containing Cr 8% or higher is considered in that the surface of the rolling element is covered with the hard nitride layer, whereby the rolling element itself is less to be damaged, and in addition, α-Fe (tempered martensite) in the nitride layer suppresses damages in the bearing ring as an opponent by increasing the slidability due to forming the film of chromium oxide.

It is assumed that the comparative examples C-3 and C-4 are somewhat poor in the durability comparing with the respective examples, because the Cr content is small, so that the effect of controlling injuries to the opponent is small.

It is also assumed that when the nitrogen concentration in the surface of the rolling element is higher than the range of the invention, the surface is very brittle and micro injuries easily appear, so that the effect by the chromium oxide film of controlling injuries to the opponent (bearing ring) is small. Reversely, when the nitrogen concentration in the surface of the rolling element is lower than the range of the invention, an amount of precipitating nitrides is small so that the hardness is gradually decreased, and the adhesion is easy to the opponent.

Although the comparative example C-12 which is the hybrid bearing where silicon nitride ceramic is used in the rolling element, is very excellent in the quietness, the sound durability and the fretting durability, since the Young's modulus in the silicon nitride ceramic is very large, this comparative example is considerably inferior in the impact resistance. Further, the specific resistance of the silicon nitride ceramic is very large as $10^{13}$ to $10^{14}$ Ω·cm and foreigners are easily absorbed by static electricity, causing badness by dust noises or transporting troubles in the production process. Further, it is apparent that as the coefficient of linear expansion of the silicon nitride ceramic is very small ($2.8 \times 10^{-5}$/° C.), the preload is varied to cause torque fluctuation, and in an extreme case, the preload is completely escaped.

The examples are below around $10^{15}$ Ω·cm in the specific resistance, at the same level in order to SUJ2, and slightly lower than SUJ2 ($12.5 \times 10^{-6}$/° C.) in the coefficient of linear expansion (for example, in the case of the steel A-4, $10.8 \times 10^{-6}$/° C.) and almost at the same level. As a material for housing the ball bearing, ferrite-stainless steels (the coefficient of linear expansion is $10.4 \times 10^{-6}$/° C.) are often employed. In this case, the varying amount of the preload at 0 to 70° C. is 0.98 N and advantageous comparing with 2.9 N in a case of the ball bearing of the rolling element being SUJ2. In case the rolling element is the silicon nitride ceramic, it is 11.8 N, and accordingly, if an initial preload is around 7.8 N at 20° C., the preload is completely escaped 70° C.

For comparing with the sound durability test, the preload was made 5 times as 58.8 N, and the high load sound durability test was carried out for 100 hours. As a result, in the case of the comparative example C-1 (the rolling element composed of SUJ2), sound deterioration of more than 3 times than the initial sound was recognized though being in short time. Even in the comparative example C-12 (the rolling element of $Si_3N_4$), the sound deterioration was 1.8 times, while in the examples, the sound deterioration was not recognized. This is considered that the Young's modulus of the ceramic ball is very large in comparison with the steel ball, and the contact pressure is large under the same load.

FIG. 6 briefly shows the range of the invention with respect to the Cr content of the steel composing the rolling element and the nitrogen concentration in the nitride layer of the rolling element.

As mentioned above, in the ball bearings of the embodiments, the characteristics of the steel as the base material are basically utilized as they are, and the quality in the only surface of the rolling element of the ball bearing is improved, so that the performance of the ball bearing is rapidly heightened. As a result, the embodied ball bearings are very excellent in the fretting durability, the impact resistance and the sound characteristics, and further, there less occur the problems of the preload escaping or the static electricity (the rate of badness by dust noises are large, and transporting troubles occur during setting up), and the present ball bearings are low-cost.

Thus, the ball bearings of the invention can be preferably used to information machinery such as HDD or VTR, in particular, transportable information machinery often encountering vibrations, or fan motors demanded to have quietness.

The ball bearings of the present embodiments are in particular suitable in application to the information machinery such as HDD or fan motors, and exhibit excellent characteristics to any other machines and usage.

The present embodiments exemplify the ball bearings as the rolling bearings, and the rolling bearing of the invention can be applied to other various kinds of rolling bearings, for example, deep groove ball bearing, angular ball bearing, cylindrical roller bearing, needle roller bearing, thrust ball bearing, thrust cylindrical ball bearing and others.

In the present embodiments, the explanation was made to the rolling bearing provided with the nitride layer only on the surface of the rolling bearing, but it is no problem to provide the nitride layer in the bearing faces of the outer and inner races.

If providing the nitride layer on the only surface in the rolling element among the bearing face of the outer race, the bearing face of the inner race and the surface of the rolling element of the rolling bearing, such rolling bearing is compatible in the excellent performance and low cost. That is, if the nitride layer is provided on the two faces or more of the above three faces, although the bearing performance is excellent, the cost is high. On the other hand, if providing on the only surface of the rolling element, as the nitride layer exists at a connection between the two bearing faces and the surface of the rolling element, the rolling bearing of the desirable performance can be obtained at low cost. If providing on either bearing face of the outer or inner races of the above three faces, it is at low cost, but as the nitride layer does not exist at the connection between the bearing face without providing the nitride layer and the surface of the rolling element, the rolling bearing of the desirable performance cannot be obtained, differently from the case of providing the nitride layer only on the surface of the rolling element.

SUS440 does not satisfy the Cr concentration of 16.00 to 18.00%, the C concentration of 0.95 to 1.20% and the formula of C %$\leq$−0.05×Cr %+1.41, and generates coarse eutectic carbide, and for making the blank ball as the present embodiment, the processability is low and it is difficult to make a ball of high precision, but as other requirement (Cr: 8% or higher) of the blank ball (steel) is satisfied, it is possible, as cases may be, to produce the rolling element as the present embodiments and apply to the rolling bearing.

M50 does not satisfy a condition of the Cr concentration, but if the using conditions of the rolling bearing is moderated, it is possible to produce the rolling element as the present embodiments by M50 and apply it to the rolling bearing.

Further, even in such a steel where Cr is replaced for at least one of V and Mo and a viscosity thereof is 8% or higher, there is sometimes a case of being able to manufacture the rolling element as the present embodiment and apply it to the rolling bearing.

In the embodiment, the quality in the surface of the rolling element composed of a steel is improved by the nitriding treatment, and as other methods of improving the quality in the surface, the vapor evaporation and the plating are known. However, although the improved quality of the layer obtained by these methods is excellent in slidability, it is extremely difficult to form the quality improved layer uniformly over the surface of the rolling bearing. In addition, for using it as the rolling member affected with high shearing stress, the boundary strength between the base material and the quality improved layer is not sufficient, and there is a problem that this layer is easily delaminated and falls off, and the reliability is insufficient.

The surface quality improving method of diffusivity such as the salt bath nitriding method, the gas nitriding method, or the ion nitriding method which have been utilized since old times as the surface treating methods of machine parts demanded to be slidable, is similar to the nitride treating method employed in the present embodiment, but these conventional methods are basically for imparting slidability, and are rarely applied to the rolling parts such as rolling bearing receiving the high shearing stress.

For example, JP-A-6-341442 discloses a rolling bearing which can be suitably used to a roller clutch of a washing machine having the excellent corrosion resistance by salt bath nitriding at least one of mechanical parts and forming on the surface thereof a compound layer of hardness being Hv654to 830 and thickness being 5 to 20 $\mu$m. JP-A-10-131970 discloses a rolling bearing which can be suitably used to an auxiliary machine such as a water pump of car engine by nitride treating at least one of mechanical parts composed of an ordinary bearing steel similarly to JP-A-6-341442 so as to improve corrosion resistance, and limiting average grain diameter of nitrides in the surface layer to be 1 $\mu$m or less so as to improve anti-seizure.

However, these prior technologies pay attention mainly to the corrosion resistance or anti-seizure, and do not refer to the sound, the fretting, the sound deterioration by impact load which are the problems particular to the rolling bearing for information machinery such as HDD, nor to the problem of escaping the preload and solving methods therefor, and they are unsatisfactory to apply as the rolling bearing for the information machinery. In particular, JP-A-10-131970 does not refer to the thickness of the nitride layer, and concerning the surface, it is assumed as remaining as nitrided, not operated with a grind-finishing, and it will be difficult to use as the rolling bearing for the information machinery demanded to have quietness. As the base material of composing parts, since ordinary bearing steels such as SUJ2 or carbonized steels are only exemplified, any study is not made on the materials.

JP-A-5-179401 discloses a rolling bearing where, by performing the nitriding treatment to a desired steel containing Cr 3% or more, a nitride layer of around Hv1000 is formed, it is difficult to be scratched by foreigners, and the rolling fatigue life when foreigners are mixed is improved. However, also in this case, similarly to the above conventional publications, this conventional art does not refer to the fretting and the sound deterioration by impact load which are the problems particular to the rolling bearing for information machinery, nor to the problem of escaping the preload and a solving method thereof.

Therefrom, it may be the that each of the above conventional examples is apparently different from the rolling bearing of the invention.

The present embodiments exemplify the rolling bearings provided on the surface of the rolling element with the nitride layer, and the invention can be applied to other rolling apparatus than the rolling bearings, that is, the rolling apparatus provided with the nitride layer on the surfaces of members composing the rolling apparatus.

Herein, the rolling apparatus is meant by such apparatus which is furnished with an outer member, an inner member, and a plurality of rolling elements rotatably disposed between the outer member and the inner member, so that the rolling elements run with respect to a first contact face which is a contacting face of the outer member to the rolling elements and a second contact face which is a contacting face of the inner member to the rolling elements and is opposite to the first contact face. For example, the rolling bearing, ball screw, or linear guide apparatus may be enumerated.

The outer member is meant by an outer race when the rolling apparatus is a rolling bearing, a slider in a case of the linear guide apparatus, and a ball screwing nut in a case of the ball screw, respectively. The inner member is meant by an inner race when the rolling apparatus is a rolling bearing, a guide rail in a case of the linear guide apparatus, and a screw axis in a case of the ball screw, respectively.

Further, the first contact face is meant by a raceway surface of the outer race when the rolling apparatus is a rolling bearing, a raceway groove of the slider in a case of the linear guide apparatus, and a screw groove of the ball screwing nut in a case of the ball screw, respectively. The second contact face is meant by a raceway surface of the inner race when the rolling apparatus is a rolling bearing, a bearing groove of the guide rail in a case of the linear guide apparatus, and a screwing groove of the screw axis in a case of the ball screw, respectively.

In short, in the present embodiment, the rolling bearing is taken up as a representative example of the rolling apparatus, explaining the movable body (outer race) rotating on the outer member, and the supporting body (the inner race or a shaft with an inner racing groove), but similarly to the rolling bearing, the present invention is also applicable to the linear guide apparatus and the ball screw.

As described the above, the rolling bearing according to the invention is excellent in the quietness, the sound durability, the fretting durability and others similarly to the hybrid bearing where the ceramic ball is used as the rolling element, and in addition thereto, there less occur the problems of the preload escaping or the static electricity (the rate of badness by dust noises are large, and transporting troubles occur during setting up), and the present ball bearings are low-cost. Thus, the ball bearing of the invention may be suitably used to machinery to encounter vibration as a small sized information machine or demanded to have high quietness.

What is claimed is:

1. A rolling apparatus, wherein rolling elements are disposed between an outer member and an inner member, and the rolling elements are rollable with respect to a first contact face being a contact face of the outer member to the rolling elements and a second contact face being a contact face of the inner member to the rolling elements, and wherein at least one of the rolling element is composed of a steel of Cr concentration Cr % being 8 wt % or more, and an accomplished rolling element is provided on the surface thereof with a layer of N concentration N % being $3 \leq N\% \leq 0.26 \times Cr\% + 4.42$.

2. The rolling apparatus as set forth in claim 1, wherein the layer formed on the surface of the rolling element includes a tempered martensite structure.

3. The rolling apparatus as set forth in claim 1, wherein a surface hardness of the rolling element is Hv1100 or higher.

4. The rolling apparatus as set forth in claim 2, wherein a surface hardness of the rolling element is Hv1100 or higher.

5. The rolling apparatus as set forth in claim 1, wherein the steel forming the rolling element contains Cr concentration Cr % being 8 to 20 wt % and C concentration C % being $C\% \leq -0.05 \times Cr\% + 1.41$.

6. The rolling apparatus as set forth in claim 2, wherein the steel forming the rolling element contains Cr concentration Cr % being 8 to 20 wt % and C concentration C % being $C\% \leq -0.05 \times Cr\% + 1.41$.

7. The rolling apparatus as set forth in claim 1, wherein the layer formed on the surface of the rolling element has a thickness being 3 μm to 2% of a diameter of the rolling element.

8. The rolling apparatus as set forth in claim 2, wherein the layer formed on the surface of the rolling element has a thickness being 3 μm to 2% of a diameter of the rolling element.

9. The rolling apparatus as set forth in claim 1, wherein the rolling surfaces of the outer and inner members contacting the rolling element comprises carbide having a length of 5 μm or less and an amount of residual austenite rR being $rR \leq 6$ vol %.

10. The rolling apparatus as set forth in claim 2, wherein the rolling surfaces of the outer and inner members contacting the rolling element comprises carbide having a length of 5 μm or less and an amount of residual austenite rR being $rR \leq 6$ vol %.

* * * * *